United States Patent [19]

Iritono et al.

[11] 3,857,468

[45] Dec. 31, 1974

[54] SELF-ADJUSTING CLUTCH OR BRAKE

[75] Inventors: Yoshihisa Iritono; Mitsuo Sakurai, both of Kiryu, Japan

[73] Assignee: Ogura Clutch Co., Ltd., Kiryu City, Gunma Prefecture, Japan

[22] Filed: Apr. 5, 1973

[21] Appl. No.: 348,151

[52] U.S. Cl. ......... 192/84 C, 192/111 A, 188/196 P
[51] Int. Cl. ..................... F16d 13/75, F16d 27/10
[58] Field of Search .......... 192/70.25, 84 C, 111 A; 188/71.8, 196 P

[56] References Cited
UNITED STATES PATENTS

| | | | |
|---|---|---|---|
| 2,970,681 | 2/1961 | Timmcke | 192/111 A |
| 3,007,561 | 11/1961 | Harting | 192/111 A X |
| 3,255,846 | 6/1966 | Livezey | 192/111 A X |
| 3,379,289 | 4/1968 | Hollnagel et al. | 188/196 P |
| 3,391,768 | 7/1968 | Fixari | 192/111 A |
| 3,394,787 | 7/1968 | Fitzgerald | 192/111 A X |
| 3,458,022 | 7/1969 | Reiff | 192/111 A X |

*Primary Examiner*—Allan D. Herrmann
*Attorney, Agent, or Firm*—Dike, Bronstein, Roberts, Cushman & Pfund

[57] ABSTRACT

In an electromagnetic device of the type wherein a driven member is attracted against a friction disc by means of an electromagnet, an annular spring seat is secured on the side of the driven member opposite the friction disc, and the radially inner end of the spring seat is bent to define an annular space between the spring seat, the driven shaft and the driven member, a slide ring having a friction member which is adapted to frictionally engage the driven shaft is disposed in the annular space and a restoring spring is interposed between the spring seat and the slide ring whereby when the driven member is brought into frictional engagement with the friction disc, the slide ring is moved toward the friction disc by the slide spring thus maintaining the gap between the friction disc and the driven member always at a definite value irrespective of the wear of the friction disc.

7 Claims, 6 Drawing Figures

SELF-ADJUSTING CLUTCH OR BRAKE

BACKGROUND OF THE INVENTION

This invention relates to an electromagnetic device, more particularly to an electromagnetic clutch or an electromagnetic brake wherein a driven member is attracted by an electromagnet into frictional engagement with a friction disc mounted on a drive shaft.

In an electromagnetic clutch and brake it is essential to maintain the gap between a friction disc and a driven disc at a constant value. However, after use of a long period, due to the wear of the friction disc, the gap gradually increases whereby it takes a long time before the friction disc and the driven disc come to engage each other. In an extreme case, the friction disc cannot engage the driven disc.

According to one approach to this problem a spring seat is integrally provided for the driven disc mounted on the shaft of a driven member and a slide ring split into two halves is seated in the spring seat. The slide ring is urged against the spring seat under a predetermined pressure by means of an annular spring. Between the slide ring and the spring seat is disposed a restoring spring which acts to slide the slide ring toward the friction disc for automatically adjusting the gap between the friction disc and the driven disc. This construction, however, is complicated, and in addition where an abnormal force such as vibration or shock is applied to the electromagnetic device the slide ring will be displaced thereby changing the gap between the friction disc and the driven disc from the predetermined value.

SUMMARY OF THE INVENTION

It is an object of this invention to provide an electromagnetic device, that is an electromagnetic clutch or electromagnetic brake which is simple in construction and capable of maintaining the gap between the friction disc and driven disc at a definite value even when the electromagnetic device is subjected to an abnormal force such as vibration or shock and when the friction disc is worn out.

According to this invention, there is provided an electromagnetic device comprising a friction disc mounted on a drive shaft, a driven member mounted on a driven shaft to be slidable in the axial direction, said driven member confronting the friction disc with a definite gap there between in an inoperated condition, an electromagnet to attract the driven member into engagement with the friction member, characterized in that there are provided an annular spring seat secured to the side of the driven member opposite the friction disc, the radially inner end of the spring seat being bent to define an annular space between the driven member, the driven shaft and the spring seat, a slide ring contained in the annular space, said slide ring being provided with a friction member adapted to frictionally engage the driven shaft, and a spring interposed between the spring seat and the slide ring whereby when the driven member is brought into frictional engagement with the friction disc, the slide ring is moved toward the friction disc by the spring seat.

BRIEF DESCRIPTION OF THE DRAWINGS

In the accompanying drawings.

DESCRIPTION OF THE PREFERRED EMBODIMENTS

Figure 1:
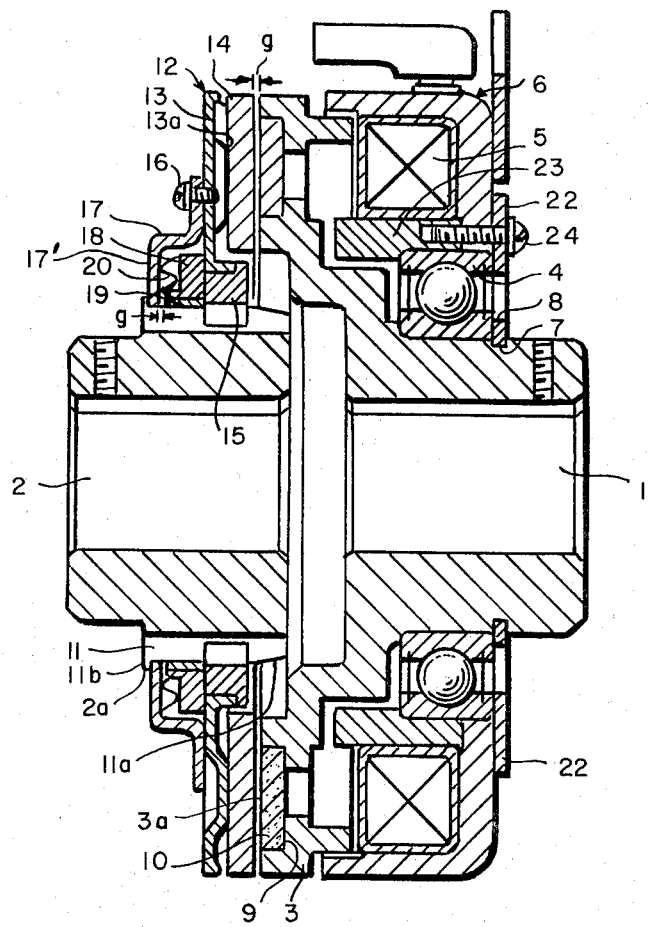
FIG. 1 shows a longitudinal sectional view of an electromagnetic clutch embodying the invention.

The electromagnetic clutch shown in FIG. 1 comprises a drive shaft 1 which is connected to a source of motive power, not shown, and a driven shaft 2 coupled to a load, not shown. On the inner end of the drive shaft is formed a rotary disc 3 and an electromagnet 6 including an energizing coil 5 is mounted on drive shaft 1 through a bearing 4 to face the rotary disc 3. The bearing 4 is secured to shaft 1 against axial movement by a snap ring 8 received in an annular groove 8 formed on the outer surface of shaft 1. The electromagnet 6 is prevented from moving in the axial direction by securing its sleeve 23 to a support 22 by means of a plurality of bolts 24. An annular recess 9 is formed on the side surface 3a of the rotary disc 3 to receive a friction disc 10.

Figure 2:
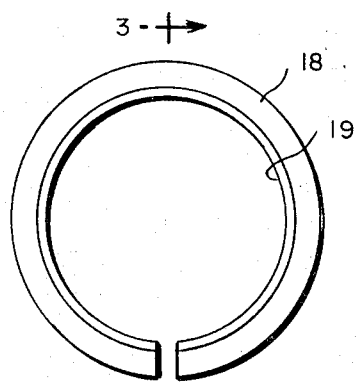
FIG. 2 shows a front view of one example of a slide ring used in this example.
Figure 3:
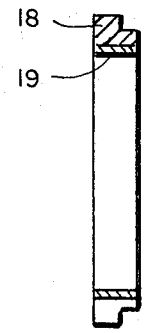
FIG. 3 is a sectional view of the slide ring shown in FIG. 2 taken along a line III — III.

A plurality of axially extending splines 11 are formed on the outer surface the driven shaft 2. Each of the splines is provided with a tapered portion 11a at its inner end which faces the inner end of drive shaft 1 and a radially extending shoulder 11b at its outer end. A driven member 12 is mounted on the splines 11 to be movable in the axial direction. The driven member 12 comprises an annular disc 13 and an armature 14 welded to the inner side 13a of the annular disc 13, and an inner gear 15 meshing with the splines 11 is secured to the inner periphery of annular disc 13. An annular spring seat 17 is secured to the outer side of the annular disc 13 by screws 16, the radially inner end of the spring seat 17 being bent to cooperate with splines 11. A slide ring 18 is mounted in a space defined by the one side surface of gear 15, the peripheral surface of splines 11 and the inner surface of the bent end of spring seat 17. As shown in FIGS. 2 and 3, a portion of the slide ring 18 is cut away and a friction member 19 made of rubber or synthetic ring or any other suitable friction material is bonded to the inner cylindrical surface of the slide ring 18. A restoring spring 20 is interposed between the slide ring 18 and spring seat 17. The frictional resistance between slide ring 18 and splines 11 is selected such that it is smaller than the magnetic pull applied to the driven member 12 by the electromagnet but larger than the force exerted by the restoring spring 20.

Figure 4:
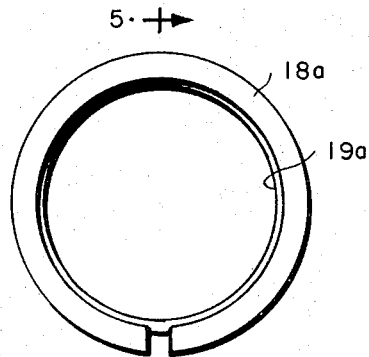
FIG. 4 shows a front view of a modified slide ring.
Figure 5:
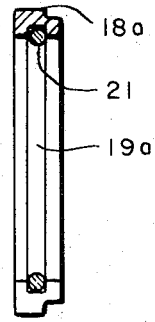
FIG. 5 shows a sectional view of the slide ring shown in FIG. 4 taken along a line IV — IV.
Figure 6:
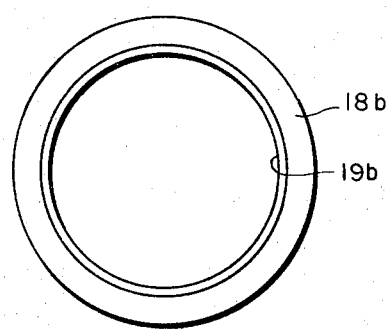
FIG 6 shows a front view of another example of the slide ring.

In the modified example of the slide ring 18a shown in FIGS. 4 and 5, instead of using a band shaped friction member 19, a friction ring 19a having a circular cross-section is mounted in a groove 21 formed on the inner surface of slide ring 18a. It should be understood that the slide ring may be divided into a plurality of arcuate sections which are interconnected by a resilient ring into an annular configulation. Alternately, as shown FIG. 6, the slide ring 18b and the friction ring 19b may take the form of continuous rings. Further, when the friction member is made of a synthetic resin it may be formed by baking a film of the synthetic resin onto the inner surface of the slide ring.

The electromagnetic clutch described above operates as follows:

When the electromagnet 6 is not energized, by the action of restoring spring 20, the armature 14 of driven member 12 is held separated from friction disc 10 by a predetermined gap g. Thus the driven shaft 2 is disconnected from drive shaft 1. Under these conditions, the driven member 12 is urged against the righthand side wall of the slide ring 18 while the lefthand side wall of the slide ring 18 is confronting the inner surface of spring seat 17 with a gap g there between.

Upon energization of the electromagnet 6, driven member 12 is attracted by the electromagnet 6 whereby the armature 14 comes to frictionally engage friction disc 10. Supposing now that the friction disc is not worn and that the gap g between the armature 14 and friction disc 10 has a definite value, the lefthand end of slide ring 18 comes to engage the inner surface of spring seat 17, but the position of the slide ring 18 will never be varied.

However, as the friction disc 10 is worn out and the gap g between it and armature 14 is increased, when the electromagnet 6 is energized, the armature 14 will be moved to the right until it comes to engage friction disc 10 even after the spring seat 17 has been brought to engage the lefthand side of slide ring 18. In other words, under these conditions, the slide ring 18 is moved toward friction disc 10 by a distance equal to the increment of the gap, thus forming a gap between driven member 12 and slide ring 18.

When the electromagnet 6 is deenergized, the driven member 12 will be pulled back by the restoring spring. However, as the movable member 12 is stopped when it engages the righthand side of slide ring 18, the gap between the friction disc 10 and the armature 14 is always kept at the predetermined value.

As the degree of wear of the friction disc 10 increases, the slide ring 18 is moved toward the friction disc by a distance equal to the increment of the wear thereby always keeping a constant gap g.

Although the invention has been described in terms of an electromagnetic clutch it will be evident that the invention is also applicable to an electromagnetic brake.

As above described, the invention provides an improved electromagnetic device capable of maintaining a constant gap between a friction disc and a driven member regardless of the wear of the friction disc, thus ensuring a constant operation time. The construction of the slide ring is much simpler than that of the prior art so that it is easy to assembly. Moreover, since the friction member is secured on the inner surface of the slide ring, the friction member will absorbs external shocks or vibration to prevent undue movement of the slide ring thereby varying the gap between the friction disc and the driven member.

While the invention has been shown and described in terms of certain preferred embodiments thereof it should be understood that many changes and modifications will readily occur to one skilled in the art within the scope of the invention as defined in the appended claims.

What is claimed is:

1. An electromagnetic device comprising a friction disc mounted on a drive shaft, a driven member mounted on a driven shaft to be slidable in the axial direction, said driven member confronting said friction disc with a definite gap therebetween in an inoperated condition, an electromagnet to attract said driven member into engagement with said friction member, characterized in that there are provided an annular spring seat secured to the side of said driven member opposite said friction disc, the radially inner end of said spring seat being bent to define an annular space between said driven member, said driven shaft and said spring seat, a slide ring contained in said annular space, said slide ring being provided with a friction member adapted to frictionally engage said driven shaft, and a spring interposed between said spring seat and said slide ring, whereby when said driven member is brought into frictional engagement with said friction disc, said slide ring is moved toward said friction disc by said spring seat.

2. The electromagnetic device according to claim 1 wherein a plurality of axial splines are formed on the outer surface of said driven shaft and said driven member is provided with a gear on its inner periphery which meshes with said splines.

3. The electromagnetic device according to claim 2 wherein radially extending shoulders are formed on the outer ends of said splines to limit the outward movement of said spring seat.

4. The electromagnetic device according to claim 1 wherein said slide ring is cut in the radial direction in at least one position.

5. The electromagnetic device according to claim 1 wherein said slide ring is a continuous ring.

6. The electromagnetic device according to claim 1 wherein said friction member takes the form of a circular band which is secured to the inner surface of said slide ring.

7. The electromagnetic device according to claim 1 wherein said friction member takes the form of a ring having a circular cross-section and received in a groove on the inner surface of said slide ring.

* * * * *